US011513646B2

(12) United States Patent
Xu et al.

(10) Patent No.: US 11,513,646 B2
(45) Date of Patent: Nov. 29, 2022

(54) ELECTRONIC DEVICE

(71) Applicant: TPK Advanced Solutions Inc., Fujian (CN)

(72) Inventors: Liang-Zhen Xu, Xiamen (CN); Yu Zhang, Xiamen (CN); Fei-Zhen Wu, Xiamen (CN); Yi-Zhong Lin, Quanzhou (CN)

(73) Assignee: TPK Advanced Solutions Inc., Fujian (CN)

( * ) Notice: Subject to any disclaimer, the term of this patent is extended or adjusted under 35 U.S.C. 154(b) by 0 days.

(21) Appl. No.: 17/189,522

(22) Filed: Mar. 2, 2021

(65) Prior Publication Data

US 2022/0283669 A1 Sep. 8, 2022

(51) Int. Cl.
*G06F 3/044* (2006.01)

(52) U.S. Cl.
CPC .. *G06F 3/0445* (2019.05); *G06F 2203/04102* (2013.01)

(58) Field of Classification Search
USPC ........................................................ 345/173
See application file for complete search history.

(56) References Cited

U.S. PATENT DOCUMENTS

2016/0362586 A1* 12/2016 Kiyoto ................. B32B 7/12

FOREIGN PATENT DOCUMENTS

| CN | 106547407 A | 3/2017 |
|----|-------------|--------|
| CN | 106919278 A | 7/2017 |
| CN | 108984032 A | 12/2018 |
| CN | 110023892 A | 7/2019 |
| CN | 110689996 A | 1/2020 |
| TW | 201604748 A | 2/2016 |
| TW | 202104464 A | 2/2021 |

* cited by examiner

*Primary Examiner* — Deeprose Subedi

(74) *Attorney, Agent, or Firm* — Cooper Legal Group, LLC

(57) ABSTRACT

An electronic device includes a flexible substrate and a plurality of metal wires. The flexible substrate includes a touch area and a peripheral area. The touch area includes a plurality of first electrodes, a plurality of insulating layers, and a plurality of second silver electrodes. The plurality of first electrodes include a first silver nanowires (SNW) conductive layer and a first conductive thin layer. The first conductive thin layer is located on the first silver nanowires (SNW) conductive layer. The insulating layers are located on the first electrodes. The plurality of second electrodes are located on the insulating layers and include a second silver nanowires (SNW) conductive layer and a second conductive thin layer. The insulating layers are configured to isolate the first electrodes from the second electrodes. The first electrodes, the second electrodes, or a combination thereof are coupled to the metal wires in the peripheral area.

20 Claims, 6 Drawing Sheets

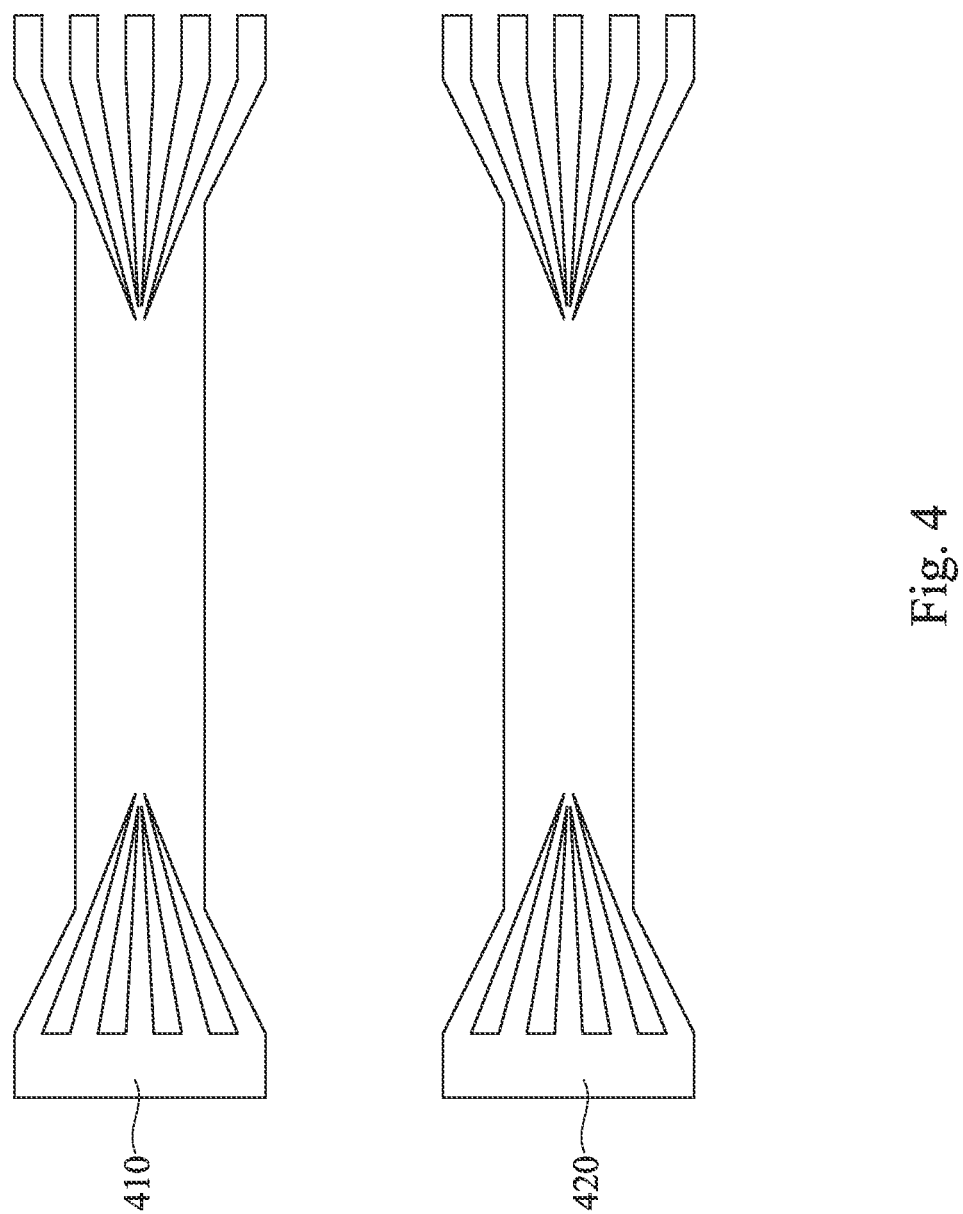

ELECTRONIC DEVICE

BACKGROUND

Field of Disclosure

The present disclosure relates to an electronic device. More particularly, the present disclosure relates to an electronic device in the field of touch technology.

Description of Related Art

Conventional display panels are developing towards the technology of ultra-thin flexible substrates. However, a sensor structure of most flexible panels is too thick so as to affect display screens. Furthermore, because a resistance of most flexible panels is high, most flexible panels cannot meet sensitivities of conventional touch pens. As described in CN106919278A, reducing a thickness of a bridge, improving a yield rate of a panel manufacturing process, and maintaining an appropriate resistance value are current issues to be solved for ultra-thin flexible panels.

For the foregoing reason, there is a need to provide some other suitable flexible panel structure to solve the problems.

SUMMARY

One aspect of the present disclosure provides an electronic device. The electronic device includes a flexible substrate and a plurality of metal wires. The flexible substrate includes a touch area and a peripheral area. The touch area includes a plurality of first electrodes, a plurality of insulating layers, and a plurality of second electrodes. The first electrodes include a first silver nanowires (SNW) conductive layer and a first conductive thin layer. The first conductive thin layer is located on the first silver nanowires (SNW) conductive layer. The insulating layers are located on the first electrodes. The second electrodes are located on the insulating layers and include a second silver nanowires (SNW) conductive layer and a second conductive thin layer. The second conductive thin layer is located on the second silver nanowires (SNW) conductive layer. The insulating layers are configured to isolate the first electrodes from the second electrodes. The first electrodes, the second electrodes, or a combination thereof are coupled to the metal wires in the peripheral area.

In the foregoing, the metal wires include copper. A resistance of each of the metal wires is between 0.001Ω and 1Ω.

In the foregoing, each of the first conductive thin layer and the second conductive thin layer includes silver. A thickness of each of the first conductive thin layer and the second conductive thin layer is between 1 nm and 50 nm.

In the foregoing, a thickness of each of the first conductive thin layer and the second conductive thin layer is between 3 nm and 25 nm.

In the foregoing, a thickness of each of the first conductive thin layer and the second conductive thin layer is between 3 nm and 15 nm.

In the foregoing, a composite resistance of the first conductive thin layer and the first silver nanowires (SNW) conductive layer is between 0.001Ω and 50Ω.

In the foregoing, a composite resistance of the second conductive thin layer and the second silver nanowires (SNW) conductive layer is between 0.001Ω and 50Ω.

In the foregoing, the touch area further includes a hybrid photoresist cover layer, and the hybrid photoresist cover layer covers the second silver nanowires (SNW) conductive layer.

In the foregoing, a thickness of the hybrid photoresist cover layer is between 0.001 μm and 3 μm.

In the foregoing, the flexible substrate includes one of polyimide (PI) or cyclic olefin polymer.

In the foregoing, the touch area further includes a buffer layer. The buffer layer is located between the flexible substrate and first silver nanowires (SNW) conductive layer.

In the foregoing, a thickness of the buffer layer is between 0.001 μm and 3 μm.

Another aspect of the present disclosure provides an electronic device. The electronic device includes a flexible substrate. The flexible substrate includes a touch area and a peripheral area. The touch area includes a plurality of first electrodes, a plurality of insulating layers, a plurality of second electrodes, and at least one conductive thin layer. The first electrodes include first silver nanowires (SNW) conductive layer. The insulating layers are located on the first electrodes. The second electrodes are located on the insulating layers. The second electrodes include a second silver nanowires (SNW) conductive layer. The at least one conductive layer is located on the first silver nanowires (SNW) conductive layer or the second silver nanowires (SNW) conductive layer. The insulating layers are configured to isolate the first electrodes from the second electrodes.

In summary, the present disclosure provides an electronic device to address problems which each of a thickness of a sensor structure and a resistance of a flexible panel being too high.

It is to be understood that both the foregoing general description and the following detailed description are by examples and are intended to provide further explanation of the present disclosure as claimed.

BRIEF DESCRIPTION OF THE DRAWINGS

The present disclosure can be more fully understood by reading the following detailed description of the embodiment, with reference made to the accompanying drawings as follows:

FIG. 4 depicts a diagram of metal wires according to some embodiments of the present disclosure.

DETAILED DESCRIPTION

Figure 1:
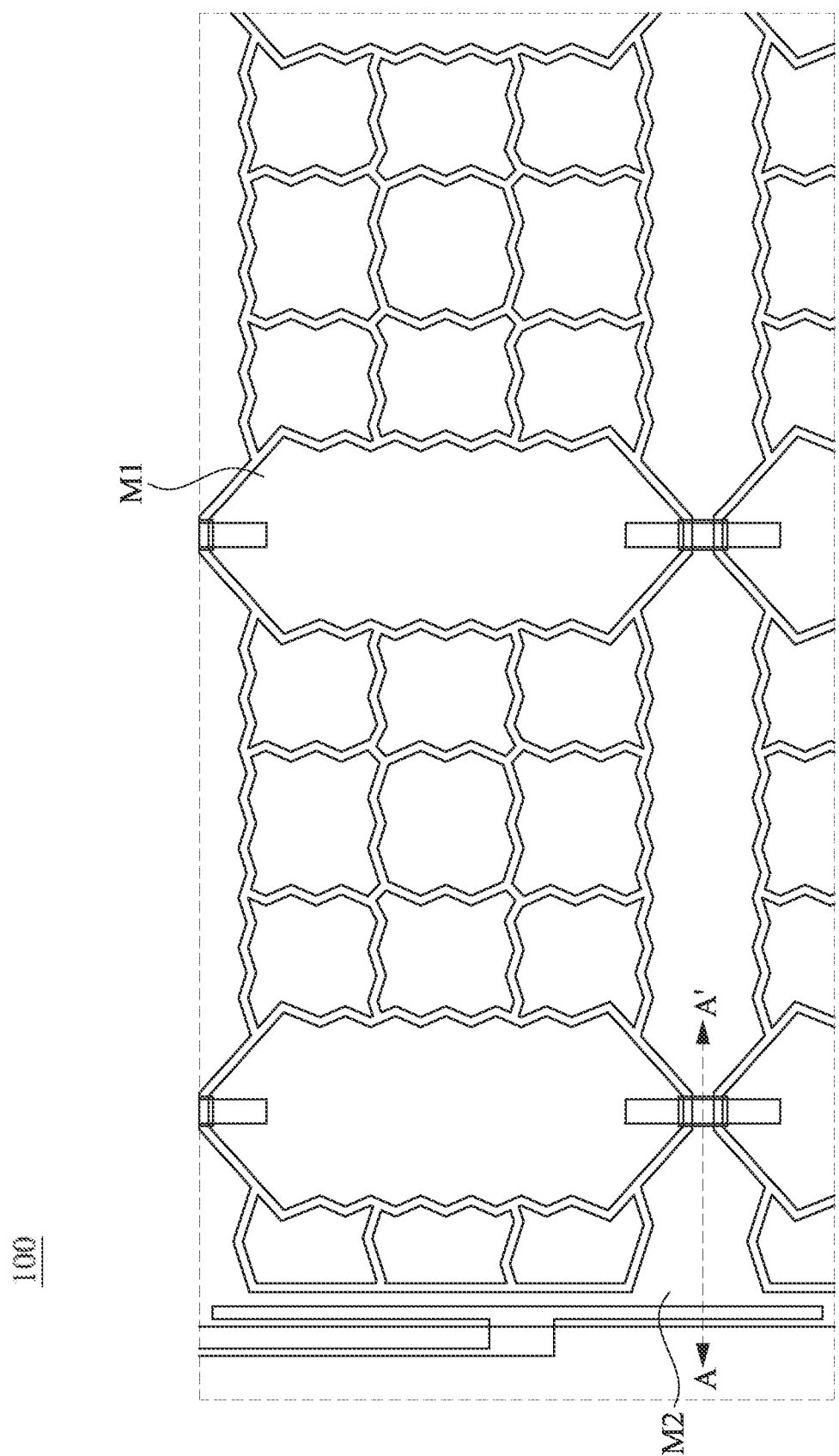
FIG. 1 depicts a top schematic view of part of a structure of an electronic device according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular example embodiments only and is not intended to be limiting of the present disclosure. As used herein, the singular forms "a," "an", and "the" are intended to include the plural forms as well, unless the context clearly indicates otherwise.

Furthermore, it should be understood that the terms, "comprising", "including", "having", "containing", "involving", and the like, used herein are open-ended, that is, including but not limited to.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

FIG. 1 depicts a top schematic view of part of a structure of an electronic device 100 according to some embodiments of the present disclosure. In some embodiments, as shown in FIG. 1, the electronic device 100 can be a panel and a display device.

The electronic device 100 includes a flexible substrate. The flexible substrate includes a touch area and a peripheral area. The touch area includes a plurality of first electrodes M1, a plurality of insulating layers, and a plurality of second electrodes M2. It should be noted that the insulating layers are located at cross-points of the first electrodes M1 and the second electrodes M2.

Figure 2A:
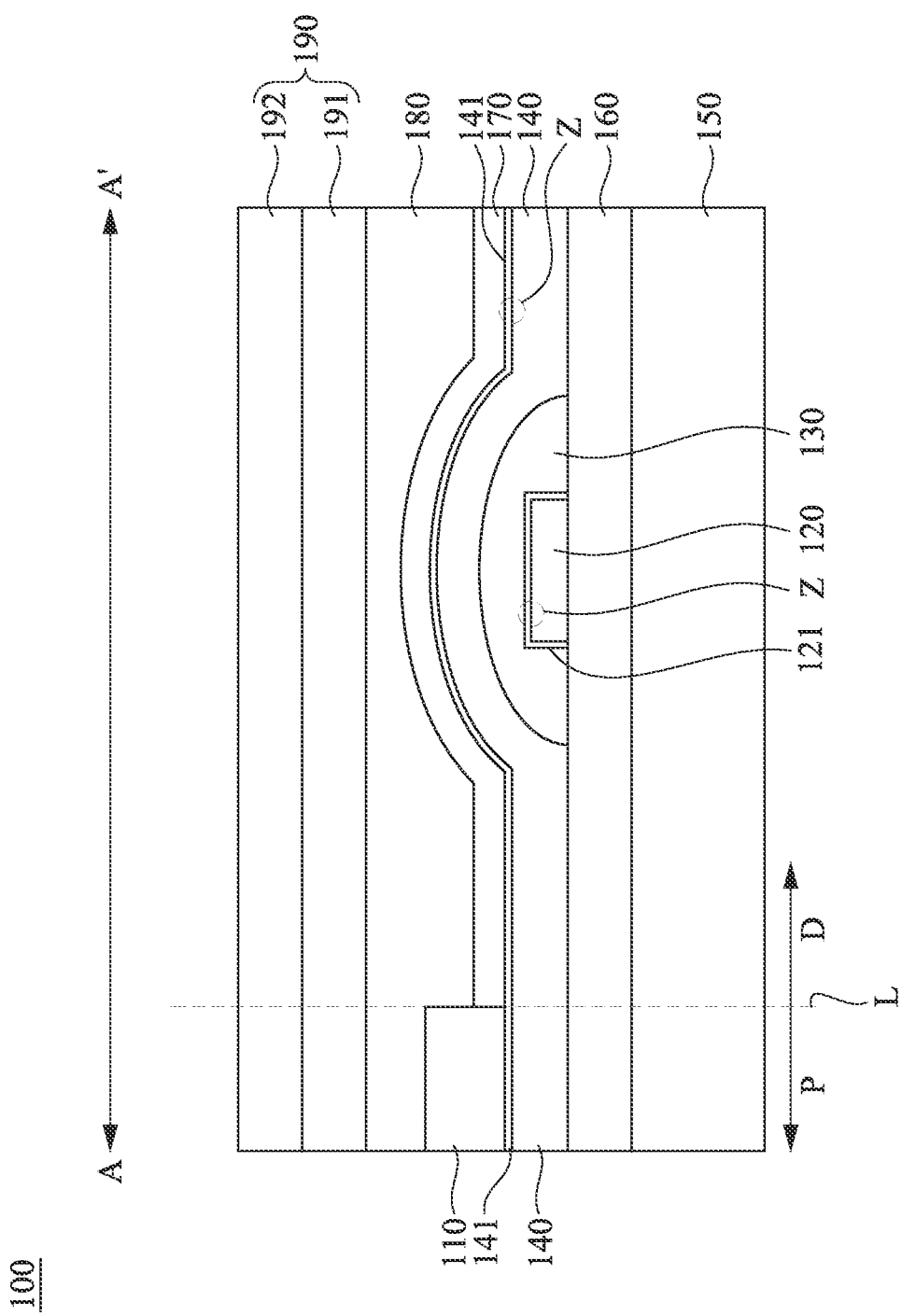
FIG. 2A depicts a side cross-sectional schematic view of an electronic device according to some embodiments of the present disclosure.

FIG. 2A depicts a side cross-sectional schematic view of an electronic device according to some embodiments of the present disclosure. Please refer to FIG. 1 and FIG. 2A; FIG. 2A is a side cross-sectional schematic view of an AA' line of the electronic device 100 shown in FIG. 1.

In some embodiments, referring to FIG. 2A, the electronic device 100 includes a flexible substrate 150, a first silver nanowires (SNW) conductive layer 120, insulating layers 130, a second silver nanowires (SNW) conductive layer 140, metal wires 110, a hybrid photoresist cover layer 170, a passivation layer 180, and a gas barrier layer 190.

In some embodiments, referring to FIG. 2A, the first silver nanowires (SNW) conductive layer 120 is located on the flexible substrate 150, and materials of the flexible substrate 150 include one of polyimide (PI) or cyclic olefin polymer. Therefore, the flexible substrate 150 has great flexibility and high optical transmittance. In some embodiments, a thickness of the flexible substrate 150 is between 0.001 μm and 50 μm. In some embodiments, a thickness of the flexible substrate 150 is between 2 μm and 25 μm. In some embodiments, a thickness of the flexible substrate 150 is between 3 μm and 10 μm.

In some embodiments, the electronic device 100 further includes a buffer layer 160. The buffer layer 160 is located between the flexible substrate 150 and the first silver nanowires (SNW) conductive layer 120. In some embodiments, a thickness of the buffer layer 160 is between 0.001 μm and 3 μm. In some embodiments, a thickness of the buffer layer 160 is between 0.01 μm and 1.5 μm. In some embodiments, a thickness of the buffer layer 160 is between 0.02 μm and 1 μm. It should be noted that the buffer layer 160 is designed in the electronic device 100 according to actual needs and according to acid-resistance and alkali of the flexible substrate 150 during a manufacturing process of the electronic device 100.

In some embodiments, referring to FIG. 1 and FIG. 2A, the first electrodes M1 include the first silver nanowires (SNW) conductive layer 120 and a first conductive thin layer 121. The first conductive thin layer 121 is located on the first silver nanowires (SNW) conductive layer 120. It should be noted that the first conductive thin layer 121 includes silver and sputters on a surface of the first silver nanowires (SNW) conductive layer 120. In some embodiments, physical properties of the first silver nanowires (SNW) conductive layer 120 are close to liquid, and the first conductive thin layer 121 may be soluble in the first silver nanowires (SNW) conductive layer 120. In some embodiments, a thickness of the first conductive thin layer 121 is between 1 nm and 50 nm. In some embodiments, a thickness of the first conductive thin layer 121 is between 3 nm and 25 nm. In some embodiments, a thickness of the first conductive thin layer 121 is between 3 nm and 15 nm. It should be noted that a function of the first conductive thin layer 121 is to reduce a composite resistance of the first conductive thin layer 121 and the first silver nanowires (SNW) conductive layer 120. Exceeding the thickness ranges mentioned in the previous embodiments will affect an optical transmittance of the first conductive thin layer 121 and the first silver nanowires (SNW) conductive layer 120. In some embodiments, the first silver nanowires (SNW) conductive layer 120 is smaller than or equal to 100 nm.

In some embodiments, a composite resistance of the first silver nanowires (SNW) conductive layer 120 and the first conductive thin layer 121 is between 0.001Ω and 50Ω. In some embodiments, a composite resistance of the first silver nanowires (SNW) conductive layer 120 and the first conductive thin layer 121 is between 3Ω and 30Ω. In some embodiments, a composite resistance of the first silver nanowires (SNW) conductive layer 120 and the first conductive thin layer 121 is between 5Ω and 20Ω.

In some embodiments, referring to FIG. 1 and FIG. 2A, the second electrodes M2 include the second silver nanowires (SNW) conductive layer 140 and a second conductive thin layer 141. The second conductive thin layer 141 is located on the second silver nanowires (SNW) conductive layer 140. It should be noted that the second conductive thin layer 141 includes silver and sputters on a surface of the second silver nanowires (SNW) conductive layer 140. In some embodiments, physical properties of the second silver nanowires (SNW) conductive layer 140 are close to liquid, and the second conductive thin layer 141 may be soluble in the second silver nanowires (SNW) conductive layer 140. In some embodiments, a thickness of the second conductive thin layer 141 is between 1 nm and 50 nm. In some embodiments, a thickness of the second conductive thin layer 141 is between 3 nm and 25 nm. In some embodiments, a thickness of the second conductive thin layer 141 is between 3 nm and 15 nm. It should be noted that the second conductive thin layer 141 is configured to reduce a resistance of the second silver nanowires (SNW) conductive layer 140. Exceeding the thickness ranges mentioned in the previous embodiments will affect an optical transmittance of the second silver nanowires (SNW) conductive layer 140. In some embodiments, the second silver nanowires (SNW) conductive layer 140 is smaller than or equal to 100 nm.

In some embodiments, a composite resistance of the second silver nanowires (SNW) conductive layer 140 and the second conductive thin layer 141 is between 0.001Ω and 50Ω. In some embodiments, a composite resistance of the second silver nanowires (SNW) conductive layer 140 and the second conductive thin layer 141 is between 3Ω and 30Ω. In some embodiments, a composite resistance of the second silver nanowires (SNW) conductive layer 140 and the second conductive thin layer 141 is between 5Ω and 20Ω.

In some embodiments, referring to FIG. 2A, the first silver nanowires (SNW) conductive layer 120 and the second silver nanowires (SNW) conductive layer 140 can be bent and have high optical transmittance. Therefore, a size of a jumper wire of the first silver nanowires (SNW) conductive layer 120 does not need to be too large, such that there is no problem of a jumper wire visible to naked eyes.

In some embodiments, it should be noted that the first silver nanowires (SNW) conductive layer 120 is configured to use as a jumper wire, and the second silver nanowires (SNW) conductive layer 140 and the metal wires 110 are formed as the entire circuit (i.e., together form a conductive pathway to increase conductivity) and pattern at the same time in the peripheral area P and the touch area D during a manufacturing process of the electronic device 100. In practice, the second silver nanowires (SNW) conductive layer 140 and the metal wires 110 use the same mask; therefore, a yellow light manufacturing process of a manufacturing process used to form the electronic device 100 can be reduced. It should be noted that each of the metal wires 110 is only located in the peripheral area P, and the metal wires 110 are coupled to the first silver nanowires (SNW) conductive layer 120, the second silver nanowires (SNW) conductive layer 140, or a combination thereof at a boundary line L. In some embodiments, materials of the metal wires 110 include copper. In some embodiments, the peripheral area P further includes the second silver nanowires (SNW) conductive layer 140, and the metal wires 110 are electroplated on the second silver nanowires (SNW) conductive layer 140 in the peripheral area P. In some embodiments, the metal wires 110 are electroplated on the first electrodes M1 and the second electrodes M2.

In some embodiments, process steps for manufacturing the first conductive thin layer 121 and the second conductive thin layer 141 include aforementioned sputtering methods or evaporation methods.

In some embodiments, a resistance of each of the metal wires 110 is between 0.001Ω and 1Ω. In some embodiments, a resistance of each of the metal wires 110 is between 0.01Ω and 0.8Ω. In some embodiments, a resistance of each of the metal wires 110 is between 0.1Ω and 0.5Ω.

In some embodiments, each of the insulating layers 130 is located between the first silver nanowires (SNW) conductive layer 120 and the second silver nanowires (SNW) conductive layer 140, and the insulating layers 130 are configured to isolate the first silver nanowires (SNW) conductive layer 120 from the second silver nanowires (SNW) conductive layer 140. In some embodiments, a thickness of each of the insulating layers 130 is between 0.001 μm and 3 μm. In some embodiments, a thickness of each of the insulating layers 130 is between 0.5 μm and 2.5 μm. In some embodiments, a thickness of each of the insulating layers is between 0.8 μm and 1.7 μm.

In some embodiments, due to the characteristics of nanosilver, it is necessary to form the hybrid photoresist cover layer 170 on the second silver nanowires (SNW) conductive layer 140 to protect the second silver nanowires (SNW) conductive layer 140 from being decomposed under ultraviolet (UV) light irradiation. In some embodiments, the hybrid photoresist cover layer 170 includes polymer solvent and photoresist during a manufacturing process so that the hybrid photoresist cover layer 170 can be exposed and patterned and can be configured to use as the hybrid photoresist cover layer of the touch area D. In addition, the hybrid photoresist cover layer 170 has high transmittance and flexibility in physical properties. The polymer solvent of the hybrid photoresist will be baked during a manufacturing process.

In some embodiments, a thickness of the hybrid photoresist cover layer 170 is between 0.001 μm and 3 μm. In some embodiments, a thickness of the hybrid photoresist cover layer 170 is between 0.02 μm and 2.5 μm. In some embodiments, a thickness of the hybrid photoresist cover layer 170 is between 0.1 μm and 1.5 μm.

In some embodiments, a thickness of the passivation layer 180 is between 0.001 μm and 3 μm. In some embodiments, a thickness of the passivation layer 180 is between 0.5 μm and 2.5 μm. In some embodiments, a thickness of the passivation layer 180 is between 1 μm and 2.5 μm.

In some embodiments, the gas barrier layer 190 is configured to prevent moisture from entering and includes a first gas barrier layer 191 and a second gas barrier layer 192. In some embodiments, the second gas barrier layer 192 is located on the first gas barrier layer 191. In some embodiments, materials of the first gas barrier layer 191 include silicon nitride ($Si_3N_4$), and materials of second gas barrier layer 192 include silicon dioxide ($SiO_2$).

In some embodiments, a thickness of the first gas barrier layer 191 is between 0.001 μm and 1 μm. In some embodiments, a thickness of the first gas barrier layer 191 is between 0.05 μm and 0.8 μm. In some embodiments, a thickness of the first gas barrier layer 191 is between 0.1 μm and 0.7 μm.

In some embodiments, a thickness of the second gas barrier layer 192 is between 0.001 μm and 1 μm. In some embodiments, a thickness of the second gas barrier layer 192 is between 0.05 μm and 0.8 μm. In some embodiments, a thickness of the second gas barrier layer 192 is between 0.1 μm and 0.7 μm.

Figure 2B:
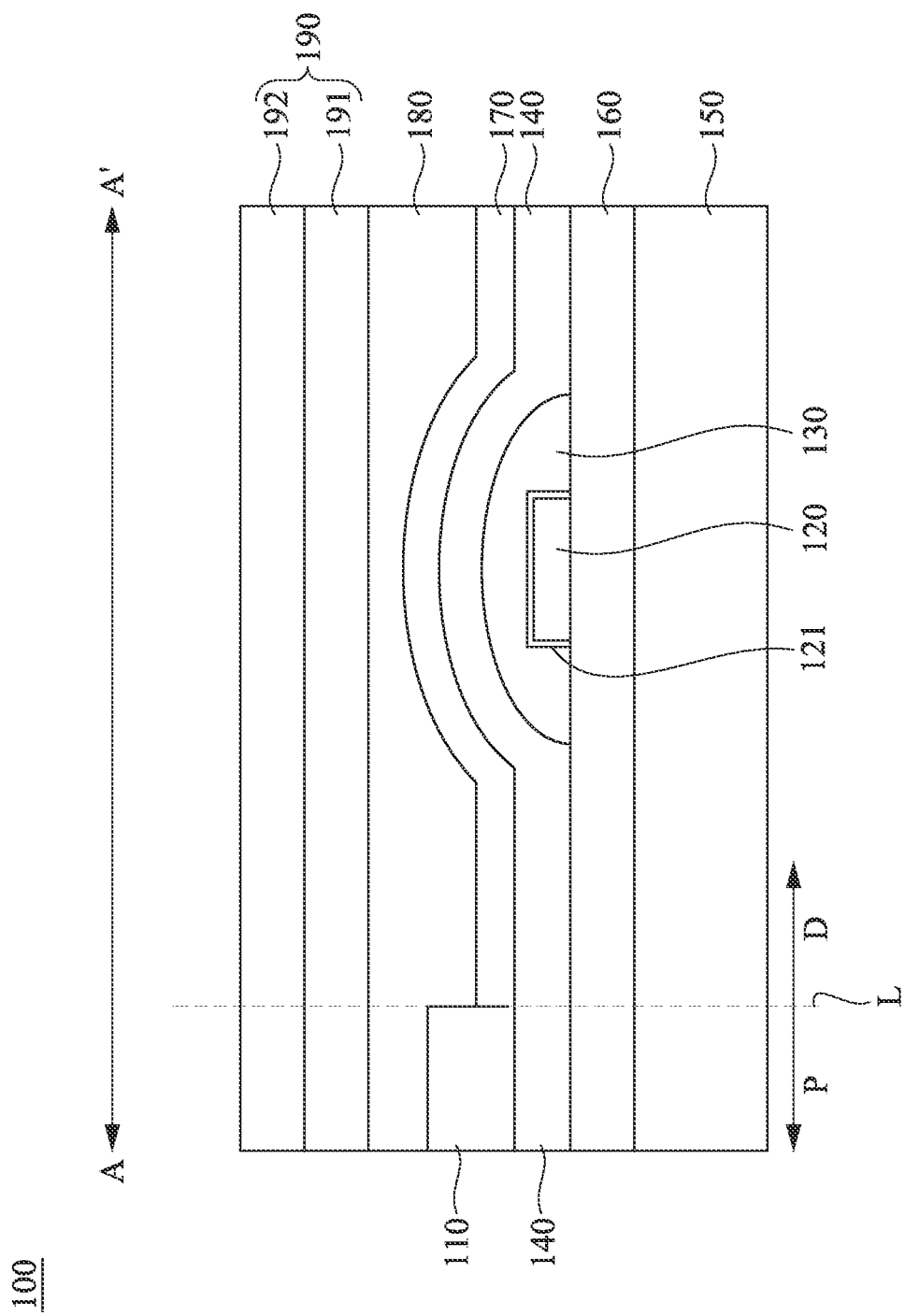
FIG. 2B depicts a side cross-sectional schematic view of part of a structure of an electronic device according to some embodiments of the present disclosure.

FIG. 2B depicts a side cross-sectional schematic view of part of a structure of an electronic device according to some embodiments of the present disclosure. In some embodiments, compared to FIG. 2A, the structure shown in FIG. 2B does not include the second conductive thin layer 141 that is located on the second silver nanowires (SNW) conductive layer 140 in FIG. 2A. The structure of the remaining part of electronic device 100 is the same as the embodiment in FIG. 2A, and repetitious details are omitted herein.

Figure 2C:
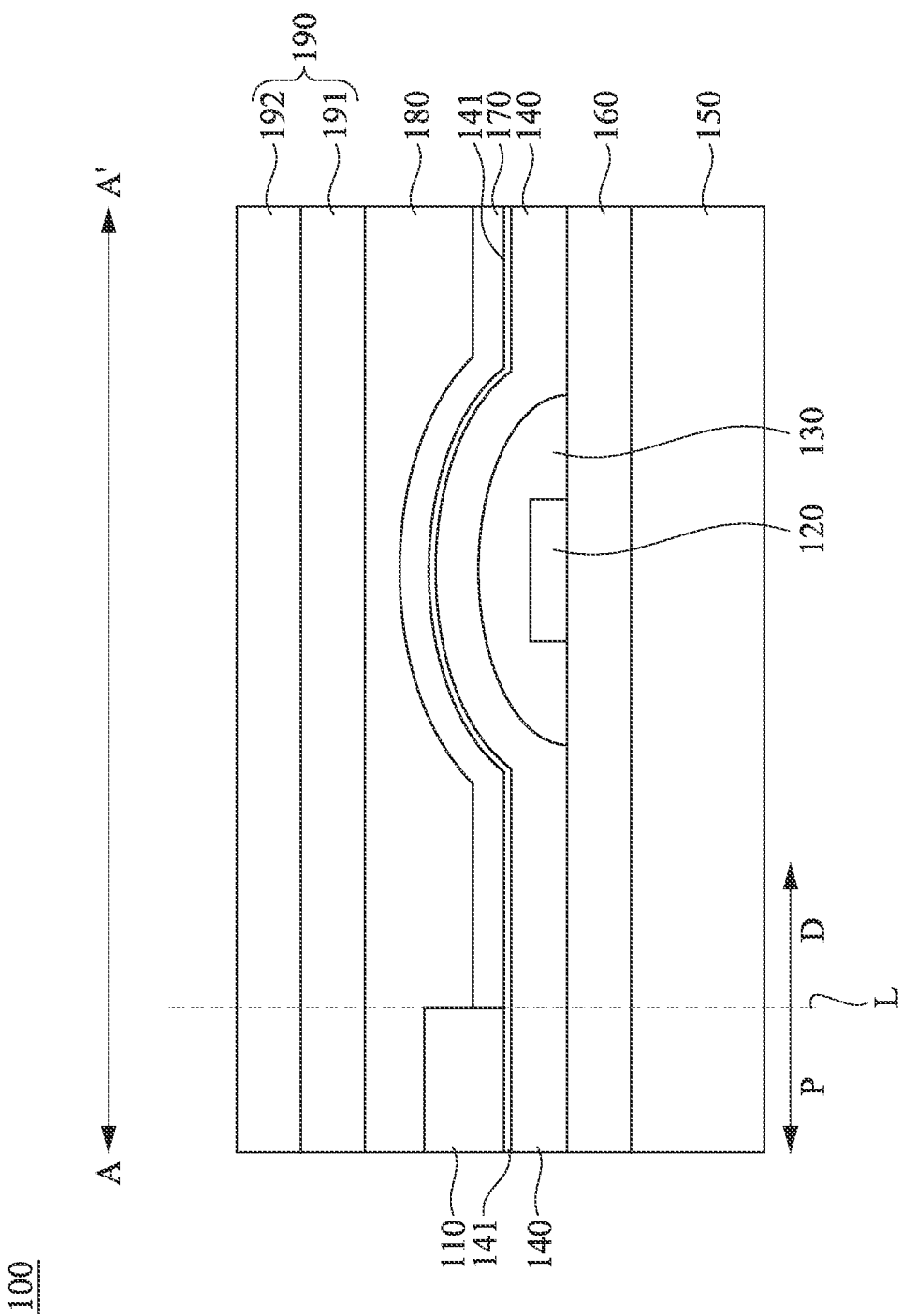
FIG. 2C depicts a side cross-sectional schematic view of part of a structure of an electronic device according to some embodiments of the present disclosure.

FIG. 2C depicts a side cross-sectional schematic view of part of structure of an electronic device according to some embodiments of the present disclosure. In some embodiments, compared to FIG. 2A, the structure shown in FIG. 2C does not include the first conductive thin layer 121 that is located on the first silver nanowires (SNW) conductive layer 120 in FIG. 2A, the structure of the rest part of electronic device 100 is the same as the embodiment in FIG. 2A, and repetitious details are omitted herein.

Figure 3:
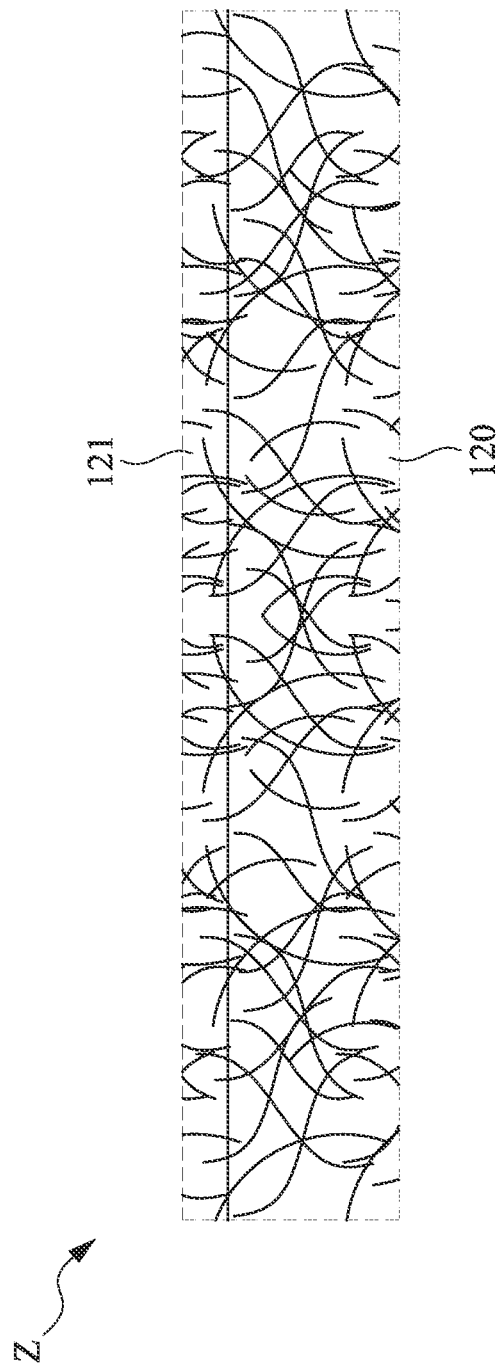
FIG. 3 depicts an enlarged side cross-sectional view of part of a structure according to some embodiments of the present disclosure.

FIG. 3 depicts an enlarged side cross-sectional view of part of structure according to some embodiments of the present disclosure. In some embodiments, FIG. 3 is an enlarged view of a cross-sectional diagram at region Z in FIG. 2A. The cross-sectional diagram at region Z is an enlarged view of the first conductive thin layer 121 sputtered on the first silver nanowires (SNW) conductive layer 120 or the second conductive thin layer 141 sputtered on the second silver nanowires (SNW) conductive layer 140. Since the silver nanowires in the silver nanowires (SNW) conductive layer are scattered and have good flexibility, the silver nanowires will not interfere with vision or produce Moire patterns. In addition, the use of silver in an electronic device has superior conductivity and can provide a faster response speed than the use of indium tin oxide (ITO) in an electronic device. Furthermore, a distribution density of silver nanowires can be controlled to improve the optical transmittance.

FIG. 4 depicts a diagram of metal wires (e.g., the metal wires 110) according to some embodiments of the present disclosure. In some embodiments, as shown in FIG. 4, the metal wires 410 are a 15 μm*15 μm overlap pattern. The metal wires 420 are a 10 μm*10 μm overlapped pattern. It should be noted that overlapped patterns of the metal wires 410 and the metal wires 420 shown in FIG. 4 are overlapped with the aforementioned first silver nanowires (SNW) conductive layer 120 and the aforementioned second silver nanowires (SNW) conductive layer 140.

Based on the above embodiments, the present disclosure provides an electronic device to address problems which each of a thickness of a sensor structure and a resistance of a flexible panel being too high.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An electronic device, comprising:
a flexible substrate, comprising a touch area and a peripheral area;
wherein the touch area comprises:
a plurality of first electrodes, wherein the first electrodes comprise a first silver nanowires (SNW) conductive layer and a first conductive thin layer, wherein the first conductive thin layer is located on the first silver nanowires (SNW) conductive layer and the first conductive thin layer of one of the plurality of first electrodes is physically and electrically isolated from the first conductive thin layer of other first electrodes of the plurality of first electrodes;
a plurality of insulating layers, located on the first electrodes; and
a plurality of second electrodes, located on the insulating layers, and comprising a second silver nanowires (SNW) conductive layer and a second conductive thin layer, wherein the second conductive thin layer is located on the second silver nanowires (SNW) conductive layer, wherein the insulating layers are configured to isolate the first electrodes from the second electrodes; and
a plurality of metal wires, wherein the first electrodes, the second electrodes, or a combination thereof are coupled to the metal wires in the peripheral area.

2. The electronic device of claim 1, wherein the metal wires comprise copper, wherein a resistance of each of the metal wires is between 0.001Ω and 1Ω.

3. The electronic device of claim 2, wherein each of the first conductive thin layer and the second conductive thin layer comprises silver, wherein a thickness of each of the first conductive thin layer and the second conductive thin layer is between 1 nm and 50 nm.

4. The electronic device of claim 3, wherein a thickness of each of the first conductive thin layer and the second conductive thin layer is between 3 nm and 25 nm.

5. The electronic device of claim 4, wherein a thickness of each of the first conductive thin layer and the second conductive thin layer is between 3 nm and 15 nm.

6. The electronic device of claim 5, wherein a composite resistance of the first conductive thin layer and the first silver nanowires (SNW) conductive layer is between 0.001Ω and 50Ω.

7. The electronic device of claim 6, wherein a composite resistance of the second conductive thin layer and the second silver nanowires (SNW) conductive layer is between 0.001Ω and 50Ω.

8. The electronic device of claim 1, wherein the touch area further comprises a hybrid photoresist cover layer, wherein the hybrid photoresist cover layer covers the second silver nanowires (SNW) conductive layer.

9. The electronic device of claim 8, wherein a thickness of the hybrid photoresist cover layer is between 0.001 μm and 3 μm.

10. The electronic device of claim 1, wherein the flexible substrate comprises one of polyimide (PI) or cyclic olefin polymer.

11. The electronic device of claim 10, wherein the touch area further comprises a buffer layer, wherein the buffer layer is located between the flexible substrate and first silver nanowires (SNW) conductive layer.

12. The electronic device of claim 11, wherein a thickness of the buffer layer is between 0.001 μm and 3 μm.

13. The electronic device of claim 1, wherein the first conductive thin layer is between the first silver nanowires (SNW) conductive layer and the second electrodes.

14. An electronic device, comprising:
a flexible substrate, comprising a touch area and a peripheral area;
wherein the touch area comprises:
a plurality of first electrodes, wherein the first electrodes comprise a first silver nanowires (SNW) conductive layer;
a plurality of insulating layers, located on the first electrodes;
a plurality of second electrodes, located on the insulating layers, wherein the second electrodes comprise a second silver nanowires (SNW) conductive layer; and
at least one conductive thin layer, located on the first silver nanowires (SNW) conductive layer or the second silver nanowires (SNW) conductive layer;
wherein the insulating layers are configured to isolate the first electrodes from the second electrodes.

15. The electronic device of claim 14, wherein:
the at least one conductive thin layer comprises a first conductive thin layer located on the first silver nanowires (SNW) conductive layer and a second conductive thin layer located on the second silver nanowires (SNW) conductive layer.

16. The electronic device of claim 15, wherein the touch area further comprises a hybrid photoresist cover layer, wherein the hybrid photoresist cover layer covers the second conductive thin layer.

17. The electronic device of claim 14, comprising a gas barrier layer over the second silver nanowires (SNW) conductive layer.

18. An electronic device comprising:
a flexible substrate, comprising a touch area and a peripheral area;

wherein the touch area comprises:
- a plurality of first electrodes, wherein the first electrodes comprise a first silver nanowires (SNW) conductive layer and a first conductive thin layer, wherein the first conductive thin layer is located on the first silver nanowires (SNW) conductive layer;
- a plurality of insulating layers, located on the first electrodes;
- a plurality of second electrodes, located on the insulating layers, and comprising a second silver nanowires (SNW) conductive layer and a second conductive thin layer, wherein the second conductive thin layer is located on the second silver nanowires (SNW) conductive layer, wherein the insulating layers are configured to isolate the first electrodes from the second electrodes;
- a hybrid photoresist cover layer, wherein the hybrid photoresist cover layer covers the second silver nanowires (SNW) conductive layer; and
- a passivation layer over the hybrid photoresist cover layer; and
- a plurality of metal wires, wherein the first electrodes, the second electrodes, or a combination thereof are coupled to the metal wires in the peripheral area.

19. The electronic device of claim 18, wherein the first conductive thin layer of one of the plurality of first electrodes is physically and electrically isolated from the first conductive thin layer of other first electrodes of the plurality of first electrodes.

20. The electronic device of claim 18, wherein the passivation layer is in contact with the hybrid photoresist cover layer.

\* \* \* \* \*